United States Patent [19]

Stoltz

[11] 4,034,481
[45] July 12, 1977

[54] INSTRUMENT WHICH IS SENSITIVE TO ACCELERATIONS

[76] Inventor: Andries Johannes Stoltz, 90 Alcade Road, Lynnwood Glen, Pretoria, Transvaal, South Africa

[21] Appl. No.: 559,707

[22] Filed: Mar. 19, 1975

[51] Int. Cl.$^2$ .................. G01C 9/12; G01C 9/16
[52] U.S. Cl. ............................................. 33/396
[58] Field of Search .......... 33/396; 73/515, 516 R, 73/516 LM

[56] References Cited

U.S. PATENT DOCUMENTS

| | | | |
|---|---|---|---|
| 1,399,423 | 12/1921 | Cunningham | 33/396 |
| 1,924,761 | 8/1933 | Turner | 33/396 |
| 2,722,056 | 11/1955 | Stimler | 33/396 X |
| 2,959,057 | 11/1960 | Winker | 73/516 R |
| 2,995,038 | 8/1961 | Singleton et al. | 73/516 R |
| 3,078,721 | 2/1963 | Sawyer | 73/516 R X |

Primary Examiner—Charles E. Phillips
Attorney, Agent, or Firm—Pennie & Edmonds

[57] ABSTRACT

An instrument is disclosed which comprises a liquid filled casing and a float structure in the casing. The float or floats of the float structure are fully submerged and this structure is mounted for rotation about a horizontal axis. The buoyancy force on the floats tends to return the float structure to a datum position and resist movement from that position. A gear system is provided for converting tilting movement of the casing with respect to the float structure into movement of a counterbalanced needle across a scale, the scale itself being mounted on the float structure. In a further disclosed form, the needle of a lower instrument has the casing of an upper, smaller but otherwise identical instrument secured thereto. In this form proximity sensors are used to detect movement of the needles with respect to the casings. Two floats are preferably employed, these being one to each lateral side of a mounting spindle of the float assembly and above a horizontal plane through the spindle.

6 Claims, 5 Drawing Figures

INSTRUMENT WHICH IS SENSITIVE TO ACCELERATIONS

This invention relates to an instrument which is sensitive to accelerations and can be used both as a tilt meter and as an accelerometer.

Instruments which react and give readings when subjected to accelerative forces are widely known. In some forms the reading obtained is a direct indication of the accelerative force applied and the so-called G-meter on a fighter aircraft is of this type. In other forms, the reading obtained is indicative of the change in attitude which has resulted from the accelerative force. In this connection reference can be made to attitude sensitive instruments in submarines and to the "bank and turn-"indicators in aircraft.

In the road building field, graders are fitted with automatic level sensing systems that include detecting instruments. These instruments detect changes in the attitude of the grader blade with respect to the ground and produce an electrical output signal which is fed to a drive system that displaces the blade back to the desired angle. A very common system in this field employs a damped pendulum with sensors (usually proximity sensors) to detect the position of the pendulum. The major problem with this system is that a sudden change in attitude, such as occurs if the grader hits a protuberance or pothole, causes the pendulum to swing with the result that conflicting correction signals are fed to the blade displacing system. The blade is thus subjected to a series of corrections and as a result of this can cut a series of corrugations in the road being graded. It will readily be understood that because of this such a system is useless in a fast moving vehicle which must travel over rough ground. More specifically, such a system could not be used to control the attitude of the cannon on a tank or other armoured vehicle, or even the guns on a heavily rolling ship.

Applicant is aware that there is another basic approach to this problem. He knows of instruments which comprise a casing, a generally horizontal shaft in the casing and mounted in bearings so that it can rotate with respect to the casing, and a pair of floats mounted on arms which project laterally from the shaft.

One instrument of which applicant is aware comprises a pair of floats which are on arms projecting to each side of a rotatably mounted shaft. The shaft and floats are within a casing which is filled with mercury, water or oil to a level such that each float is partly submerged.

A major fault with an instrument of this type is that, if subjected to violent accelerative forces, the liquid flows rapidly from side-to-side in the casing and in so doing causes the floats to oscillate wildly with respect to the casing. This results in fluctuating output signals and there is consequently a period of time during which the instrument is completely unreliable for it is producing a signal which calls first for a maximum correction in one direction and then for a maximum correction in the other direction. No system can utilise such output signals in a proper manner.

It is a primary object of the present invention to provide an instrument which, even if subjected to violent accelerative forces, still gives a usable output signal after the briefest of reaction times.

According to one aspect of the present invention there is provided an instrument comprising:

a. a liquid-filled casing,
b. a float structure in the casing,
c. means mounting the float structure for rotation about a horizontal axis relatively to the casing,
d. the float structure comprising immersed float means the upward bouyancy derived force on which acts to maintain the float structure in a datum position with respect to horizontal,
e. means for converting relative movement between said casing and said float structure into an output reading.

A possible solution to the problem of the liquid oscillating back and forth comprises providing two float chambers separated by a narrow passage. When the instrument tilts, liquid flows from one chamber to the other. This certainly has the effect of damping out the to-and-fro movement which can be imparted to the liquid but at the same time has a detrimental effect on reaction time. If the instrument is tilted quickly enough, the float structure moves as if it is integral with the casing for there has been no time for liquid to flow from one chamber to the other. Thereafter, liquid flows through the passage and eventually the instrument gives a reading which indicates the degree of tilt. Because of the slow reaction time, the instrument is often giving an indication of a condition which no longer exists.

A further object of the present invention is to provide a measuring instrument which produces a reliable output signal even when subjected to violent accelerative forces and which additionally has a short reaction time.

Another problem with known instruments of this type is to obtain from the instrument a usable output signal. It is known to employ a potentiometer to measure the angular displacements of the shaft with respect to the casing. This gives rise to many problems for a change in angle of a few degrees gives rise to only a minute change in electrical resistance at the potentiometer. Hence the instrument must tilt through a certain number of degrees before a reading is obtained. Thus its sensitivity is small and furthermore any lack of uniformity in the rate of change of electrical resistance in the potentiometer gives rise to inaccurate readings.

Consequently a further object of the present invention is to provide a simple but highly efficient system which can translate the movement of the instrument casing with respect to the float structure into a visual output signal thereby to avoid the difficulties inherent in obtaining an electrical output signal.

The invention also provides a structure which can eliminate readings due to acceleration and give a reading which is correct as regards tilt.

According to this aspect of the present invention there is provided an instrument comprising a first vessel, a first axle within the first vessel, means mounting the first axle so that it is capable of performing rotary oscillations with respect to the first vessel, first float means carried by the first axle and arranged to exert on the first axle a force tending to return the first axle to a datum position, a first indicating member fast with the first axle, a first counterbalancing mass fast with the first axle, a second vessel mounted on the first indicating member, a second axle within the second vessel, means mounting the second axle so that it is capable of performing rotary oscillations with respect to the second vessel, second float means carried by the second axle and arranged to exert on the second axle a force tending to return the second axle to a datum position, a second indicating member fast with the second axle, a counterbalancing mass fast with the second axle, first sensing means for sensing the position of the first indicating member with respect to the first vessel, and second sensing means for sensing the position of the second indicating member with respect to the second vessel, the sensing means producing electrical output signals.

For a better understanding of the present invention reference will now be made, by way of example, to the accompanying drawings in which.

Figure 5:
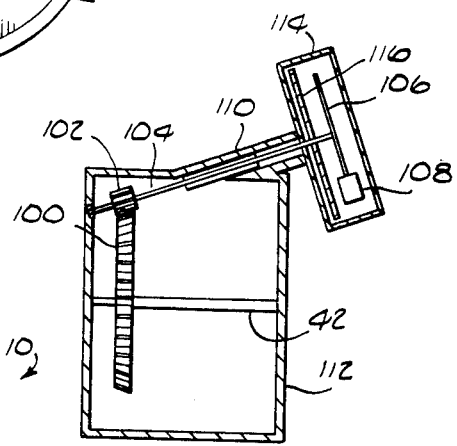
Figure 4:
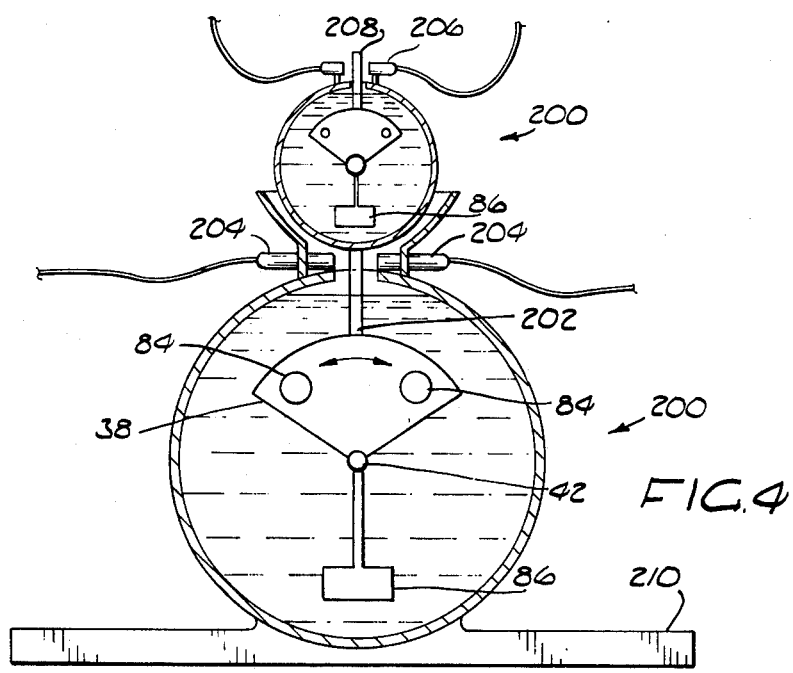

FIG. 4 diagrammatically illustrates a unit consisting of two instruments according to the present invention, and FIG. 5 illustrates a further form of instrument.

Figure 1:
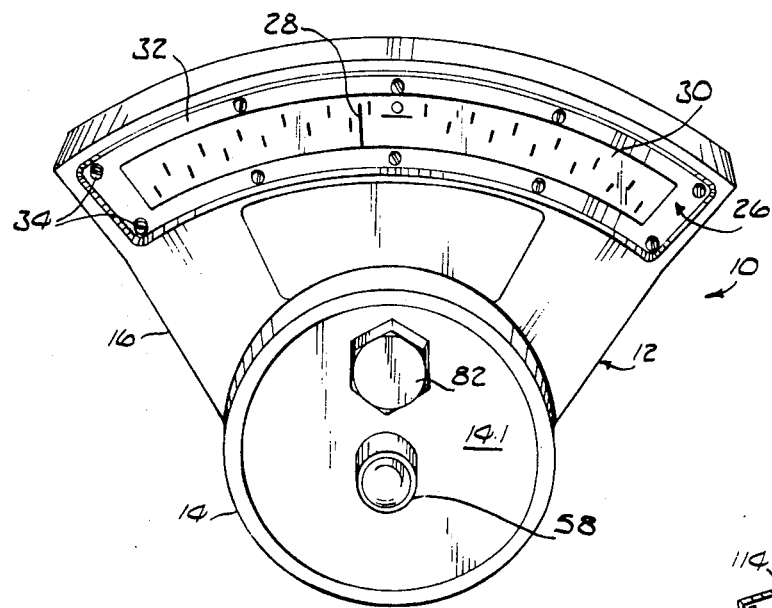
FIG. 1 is a pictorial view of an instrument which is sensitive to the forces of acceleration to which it is subjected.

The instrument of FIG. 1 is generally referenced 10 and comprises a fluid-tight casing 12 which, in use, is filled with a liquid as will be described in more detail hereinafter. The casing 12 consists of a short cylinder 14 and a sector shaped portion 16. The cylinder 14 has an arcuate slot 18 between its ends and in the upper part thereof, and the portion 16 is secured to the cylinder 14 in such manner that the portion and cylinder communicate with one another via the arcuate slot. Disc-like cover plates 14.1 close the rear and front ends of the cylinder 14 and can be screwed into the ends of the cylinder. The casing 12 is preferably of moulded synthetic plastics material but can be of a metal such as aluminum or steel.

The portion 16 is formed with a window 26, there being a needle 28 and a scale 30 which are visible through a window. The window 26, is constituted by an arcuate aperture and is closed by a cover 32 of glass, perspex or synthetic plastics material which is secured in place by screws 34.

Figure 2:
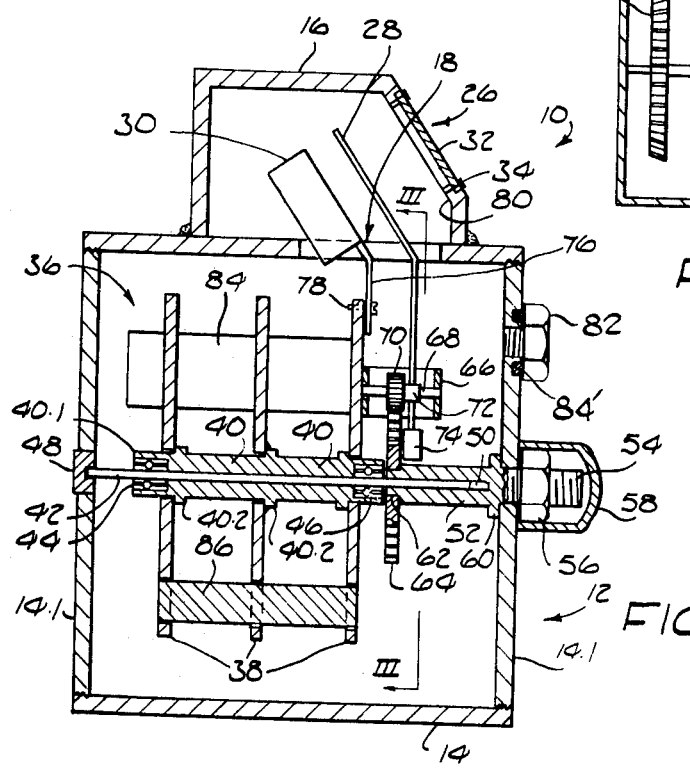
FIG. 2 is a diagrammatic cross-section of the instrument shown in FIG. 1.
Figure 3:
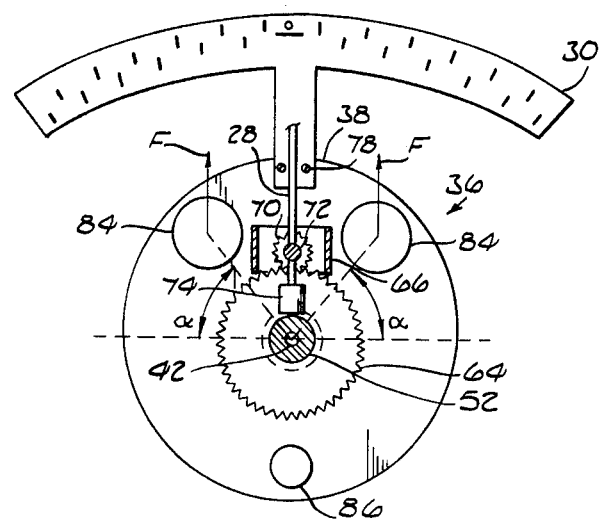
FIG. 3 is a section of the line III—III of FIG. 2.

Referring now specifically to FIGS. 2 and 3, there is in the casing 12 a float structure 36 which comprises three disc-like plates 38 which are spaced apart and connected together by means of a tubular element 40. A main spindle or axle 42 passes through all three plates and through the tubular element 40. Bearings 44 and 46 mount the float structure 36 on the spindle 42 and permit it to oscillate freely with respect to the spindle 42. The outer races of the bearings 44 and 46 are secured to the spigots 40.1 and the inner races to the spindle 42. The plates 38 are secured to the ribs 40.2 which encircle the element 40.

At one of its ends, the lefthand end as shown in FIG. 2, the spindle 42 is supported by a bearing bush 48 which is a force fit in an aperture provided in the end cover 14.1 of the casing 12. At its other end the spindle 42 is entered in the axial bore 50 of a bearing sleeve 52, this bearing sleeve passing through the cover plate 14.1 and the projecting portion thereof being threaded as shown at 54. A nut 56 is threaded onto the portion 54 and a cover 58 (which is also shown in FIG. 1) hides the nut 56 and threaded portion 54 thereby to improve the appearance of the device. The sleeve 52 has, internally of the casing 12, an outwardly projecting circumferential rib 60 which, when the nut 56 is tightened, bears against the inside face of the casing 12.

At the end thereof adjacent the float structure 36, the bearing sleeve 52 is stepped so as to provide a spigot portion 62 onto which is force fitted a sun gear 64. A box structure 66 is secured to the righthand plate 38 and a spindle 68 has its ends carried by the front and rear walls of the box structure. On the spindle 68 there is a planet gear 70. The spindle 68 also carries a collar 72 which may either be separate from the gear 70 or an integral part thereof. In either event, both the planet gear 70 and collar 72 are fast in rotation with the spindle 68 and this is achieved by means of keys, grub screws or the like (not shown).

The needle 28 is carried by the collar 72 and a counterweight 74 depends from the collar 72. The counterweight so balances the needle that when the device is subjected to an accelerative force, the tendency of the needle to rotate the spindle 68 in one direction is exactly balanced by the tendency of the counterweight to rotate it in the other direction.

It will be noted that the scale 30 is carried by an arm 76 which projects upwardly from the righthand plate 38 and which is secured thereto by means of a screw 78. It will further be noted that the window 26 is encircled by an inwardly projecting flange 80, the screws 34 passing through the cover 32 and into the flange 80 to secure the cover 32 in place.

A filling plug 82 is threaded into an aperture in the casing 12 and the head of the plug, which is in the form of a nut, bears on an O-ring 84 to ensure that the filling aperture is satisfactorily sealed. The instrument is entirely filled with a suitable oil via the filling aperture.

The float structure 36 comprises, as described above, the three disc-like plates 38 and the spacer element 40 together with two floats 84 and a counterweight 86. The relative arrangement of the floats and counterweights can best be seen in FIG. 3 and once again the structure is such that, when the instrument is subjected to an accelerative force, there are no out of balance turning moments derived from mass which tend to rotate the float structure above the spindle 42. In other words, the mass above the axis of the spindle 42 equals the mass below, and hence the rotation of the structure 36 which occurs when the instrument is subject to acceleration is due to the forces exerted on the floats by the liquid under such conditions of acceleration. This is dealt with in more detail below.

It will be understood that upwardly directed, bouyancy derived forces (represented by the arrows F in FIG. 3) act on the float structure 36. If we assume that the float structure is rotated clockwise from the position illustrated in FIG. 3, then the line of action of the force on the righthand float 84 moves away from the axis of the spindle 42 and the line of action of the other force moves towards this axis. The turning moment tending to displace the float structure anti-clockwise then exceeds the opposing moment by an amount dependent on the distances between the lines of action of the forces and the axis of the spindle 42. Thus the further the float structure is turned, the greater the restoring force. This is the most important factor in providing the rapid damping which is a characteristic of the instrument. The result is that the effect of the accelerative forces which accompany movement of the instrument to a tilted position are quickly suppressed and a true reading of the angle of tilt is obtained in a very short time. Of course, it will be understood that the float structure continually resists any displacement from its datum position and it is only under exceptional circumstances, such as very rapid movement, that the damping qualities of the instrument are fully used.

If reference is now made once more to FIG. 2, it will be seen that even if the casing is tilted, the scale 30, being part of the float structure, remains stationary. There are two reasons why the float structure fails to move. Firstly, there are the above described restoring forces derived from the floats. Secondly the float structure, by virtue of its mass, also resists rotation and it is only if a sufficient force is imposed thereon that it will move. Only friction in the bearings and drag in the liquid filling the casing can cause a rotational force to be exerted on the float structure. Under normal conditions these forces are relatively small in relation to those resisting movement of the float structure. The planet gear 70 also remains in a top dead centre position with respect to the spindle and the effect is, therefore, that the sun gear 64, being fast with the casing, moves with respect to the planet gear. Such movement is effective to rotate the gear 70, and hence the collar 72, so that the needle 28 moves across the scale 30. The gear ratio employed is preferably 10:1 so that a small relative movement of the gear is mechanically amplified into a relatively large movement of the needle. Thus a reading is obtained which is indicative of tilt.

If the casing 12 is subjected to violent accelerations, e.g. is moved rapidly back and forth, then the forces in the liquid causes the float structure to rotate and the liquid to flow to-and-fro. This results in the float structure, and hence the needle, oscillating. Experiments have shown that it takes only approximately 8/10 of a second for stability to be restored once the violent motion ceases to act on the casing. This is very considerably shorter then the time which is obtainable with floats which are partially immersed in the liquid and which move up and down with the liquid as it flows back and forth in the casing. In the instrument described, only the movement of the molecules in the oil can impart motion to the float structure and generally such effect is insignificant in relation the other forces. Such to-and-fro movement of the liquid in a casing which is only partially filled can last for several seconds during which no usuable reading is obtainable.

It will be understood that, as the casing is completely filled, all the parts illustrated in FIG. 2 move in the liquid.

Generally speaking, the float structure tends to move with the liquid in the casing when the instrument is subject to accelerative forces. Any tendency of the float structure to move relatively to the liquid obviously results in drag which itself has a damping effect. As regards the needle, this does move through the liquid and damping forces are always imposed on this as it moves.

Turning now to the use of the instrument as an accelerometer, it will be understood that acceleration forces on the fluid are themselves transmitted to the float structure. The effect of these forces on the floats is greater than their effect on the counterweight because of the greater size of the floats. Thus the float structure rotates and while the force continues to act, a reading indicative of acceleration is obtained. Immediately the force ceases, the restoring forces discussed above return the needle to its zero position unless, simultaneously with the acceleration, there has been a change in attitude. If there has, then after the brief time period mentioned above, the instrument settles down to give a reading indicative of this.

In the special case of where the instrument tilts about the axis of the spindle 42, accelerative forces are directed radially and have no effect on the float structure. In this case a true indication of tilt is obtained at all times.

If reference is made once more to FIG. 3, it will be noted that angles $\alpha$ are marked between the horizontal plane which passes through the axis of the spindle 42 and lines which extend from the axis of the spindle 42 to the centres of bouyancy of the floats 84. This is the preferred angle for the rate at which the restoring force increases is at a maximum with this configuration. However, it will be understood that angles of, say 35° to 65° are possible although the sensitivity of the instrument falls off as the angle $\alpha$ deviates from 45°.

In a further embodiment which has not been illustrated, a float of triangular form is employed, the float being arranged with one of its flat faces uppermost and an apex directed downwardly. The centre of bouyancy of such a flat is normally vertically above the axis of the spindle 42. This means that if the float structure is rotated with respect to the casing out of its datum position, a restoring force is immediately created as a result of the lateral displacement of the centre of bouyancy.

The instrument to be described with reference to FIG. 4 can be employed as part of the cannon stabilizing structure of a military vehicle such as a tank. Such a vehicle, as it traverses the terrain, is subjected to violent but short-lived changes in attitude i.e. as it drops into and rises from a crevice or ditch, and to more permanent changes in attitude as it moves between level and inclined ground. It is undesirable that the first type of change should cause the cannon stabilizing structure to exert any correcting influence for, before such correction is completed, the attitude has reverted to that which existed previously and a counter-correction starts. Thus not only is the cannon misdirected while the vehicle is traversing the crevice etc. but also for some time after i.e. until the counter-correction is complete.

The instruments of FIG. 4 are diagrammatically illustrated and, where applicable, the same reference numerals as are employed in the earlier Figures have been used. In this form, each unit of the instrument has a single plate 38 mounted on the spindle or axle 42 and there are no scales. Instead, a relatively sturdy needle 202 constituting an indicating member projects upwardly from the lower plate 38 and a further, smaller instrument 200 is carried on this needle. Proximity sensors 204 are provided to detect movement of the needle 202 and further proximity sensors 206 are provided to detect movement of the needle or indicating member 208 of the upper instrument 200.

In use of the double instrument of FIG. 4, a sudden change in attitude, whether permanent or merely temporary, results in the base plate 210 tilting from level or from the inclined position it was previously in, this being accompanied by accelerative forces. The lower float structure, if the acceleration is of sufficient magnitude, tends initially to rotate inside the casing. However, this effect is short-lived and the float structure returns to the vertical position shown so that an "out-of-level" signal is obtained from the sensors 204. The viscosity of the liquid, it will readily be understood, greatly influences the operating characteristics.

The casing of the upper instrument must, of course, move with the needle 202. The movement of the needle 202 is far more pronounced than the movement of the casing of the lower instrument because of the effect of accelerative forces on the fluid which displace the floats out of their vertical position in the direction of the accelerative force. The casing of the upper instrument is thus displaced in the direction of the accelerative force. The needle 208 registers this additional force in spite of the fact that the upper casing is describing an arc in the same direction.

Thus we can distinguish between three conditions. These are:

a. a short-lived acceleration followed by a counter acceleration resulting in no permanent change in attitude. In such circumstances, both sets of sensors produce output signals during the changes in attitude;

b. a short-lived acceleration resulting in a permanent change in attitude. In these circumstances, both sets of sensors initially produce output signals. However in this case restoration of the lower float structure to vertical causes the upper casing to be returned to its initial position. This means that the upper float structure is once again centralized with respect to the sensors 206 and the output signal from these sensors ceases;

c. a change in angular displacement only in which case the lower assembly will register whereas the upper assembly will remain centralized because the lower assembly does not rotate.

It will be understood therefore, that the double instrument of FIG. 4 can be used to distinguish between temporary acceleration forces, which do not require a correction in the position of the cannon, and a more permanent change in attitude which does require such a correction. It will further be understood that a slow change in attitude, such as results from the tank crossing undulating terrain, results in relative displacement between the lower float structure and casing (and hence a signal from the lower sensors) but no relative movement between the upper float structure and the upper casing. This is because the lower needle remains stationary.

It follows from what has been said that, for purposes of correction, signals from the sensors 206 (indicating acceleration forces) are used to prevent the signals from the sensors 204 (which may indicate acceleration or attitude change) from reaching the servo motors or the like which alter the cannon attitude. Only when the signals from the sensors 206 cease are the signals from the sensors 204 (which then indicate an attitude change) effective.

Referring finally to FIG. 5, this illustrates a modified arrangement by means of which the reading is obtained. Fast with the float assembly is a bevel gear 100 which meshes with a pinion 102. The pinion 102 is fast with a shaft 104 mounted in bearings (not shown) carried by the casing 12. A needle 106 is mounted on the upper end of the shaft 104, the needle being counterbalanced by a weight 108. The shaft 104 passes through a tube 110 which forms the connection between the interior of the main casing part 112 and a subsidiary casing part 114. The scale is referenced 116, is circular and is mounted within the casing part 114.

The spindle 42 is diagrammatically shown in FIG. 5 but the entire float structure to which the gear 100 is attached has been omitted.

I claim:
1. An instrument comprising:
   a. a liquid-filled casing,
   b. a float structure in the casing,
   c. means mounting the float structure for rotation about a horizontal axis relatively to the casing,
   d. the float structure comprising a pair of immersed floats the centres of bouyancy of which are spaced apart in the horizontal direction so as to lie one on each lateral side of said horizontal axis and each of which centres of bouyancy is above the horizontal plane containing said horizontal axis and the upward bouyancy derived forces on which act to maintain the float structure in a datum position with respect to horizontal, and
   e. means for converting relative movement between said casing and said float structure into an output reading, such means being constituted by gears for mechanically amplifying the movement of the casing with respect to the float structure, and said gears comprising a sun gear fast with the casing and a planet gear rotatably mounted on the float structure, there being a scale fast with the float structure and a needle fast with said planet wheel and positioned so as to move across the scale when said planet gear is rotated upon tilting of the casing.

2. An instrument according to claim 1, wherein said needle projects in both directions from said planet wheel, one projecting portion being longer than the other, said one portion moving across the scale and the other including a counterweight for balancing the needle about its axis of rotation.

3. An instrument according to claim 1, in which the angles between said horizontal plane and lines extending from said horizontal axis to the centres of bouyancy of the float are in the range 35° to 65°.

4. An instrument according to claim 3, in which said angles are 45°.

5. An instrument according to claim 1, wherein the float structure includes a counterbalancing mass below said horizontal plane equal to the mass of the float structure above said horizontal plane.

6. An instrument comprising a first vessel, a first axle within the first vessel, means mounting the first axle so that it is capable of performing rotary oscillations with respect to the first vessel, first float means carried by the first axle and arranged to exert on the first axle a force tending to return the first axle to a datum position, a first indicating member fast with the axle, a first counterbalancing mass fast with the first axle, a second vessel mounted on the first indicating member, a second axle within the second vessel and parallel to the first axle, means mounting the second axle so that it is capable of performing rotary oscillations with respect to the second vessel, second float means carried by the second axle and arranged to exert on the second axle a force tending to return the second axle to datum position, a second indicating member fast with the second axle, a counterbalancing mass fast with the second axle, first sensing means for sensing the position of the first indicating member with respect to the first vessel, and second sensing means for sensing the position of the second indicating member with respect to the second vessel, the sensing means producing electrical output signals.

* * * * *

UNITED STATES PATENT AND TRADEMARK OFFICE
CERTIFICATE OF CORRECTION

PATENT NO. : 4034481
DATED : July 12, 1977
INVENTOR(S) : ANDRIES JOHANNES STOLTZ It is certified that error appears in the above—identified patent and that said Letters Patent are hereby corrected as shown below:

Column 1, Line 8 "give readings" should read "give a reading"

Column 2, Line 18 "time has" should read "time it has"

Column 5, Line 42 "relation the" should read "relation to"

Column 6, Line 22 "flat" should read "float"

Signed and Sealed this

Twenty-ninth Day of November 1977

[SEAL]

Attest:

RUTH C. MASON
Attesting Officer

LUTRELLE F. PARKER
Acting Commissioner of Patents and Trademarks